Feb. 17, 1931.   A. B. WHITEHEAD   1,792,951
GATE STRUCTURE
Filed Feb. 16, 1929    2 Sheets-Sheet 1
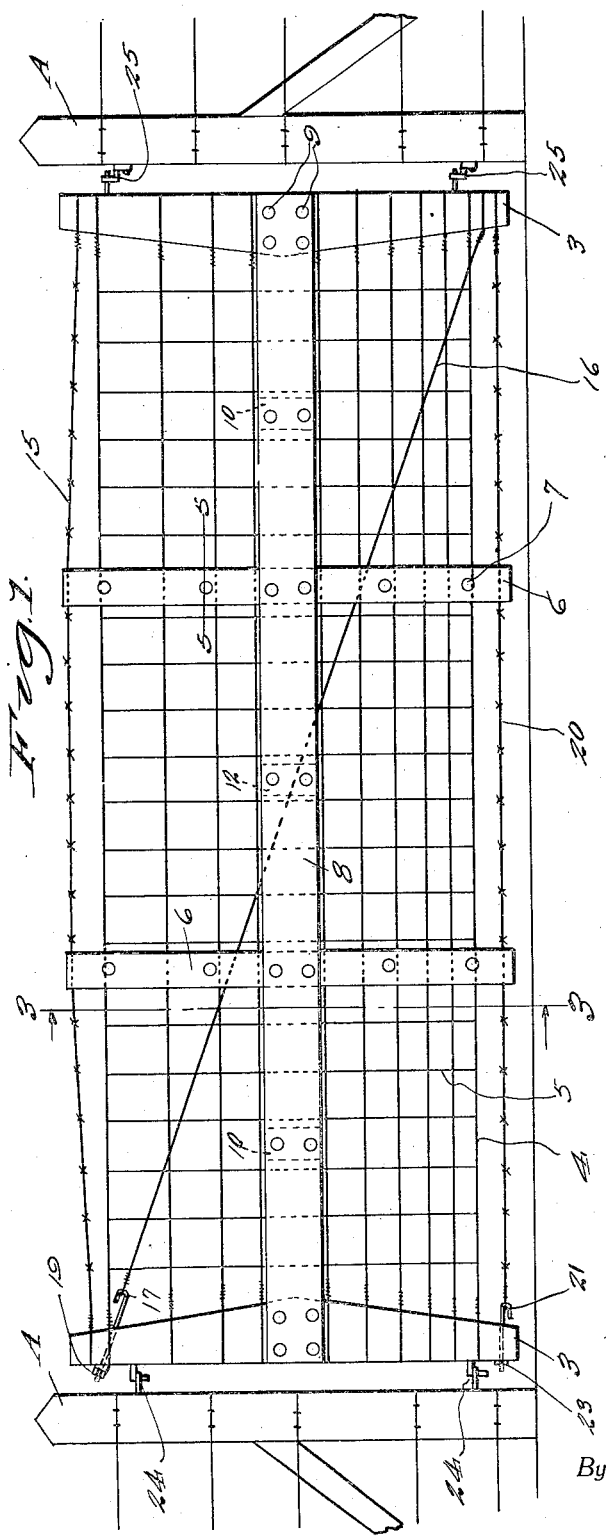
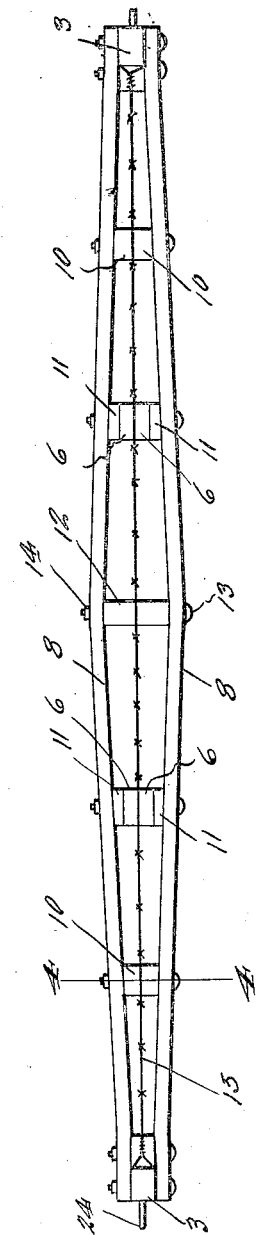
Inventor
*Argus B. Whitehead*
By *Clarence A. O'Brien*
Attorney

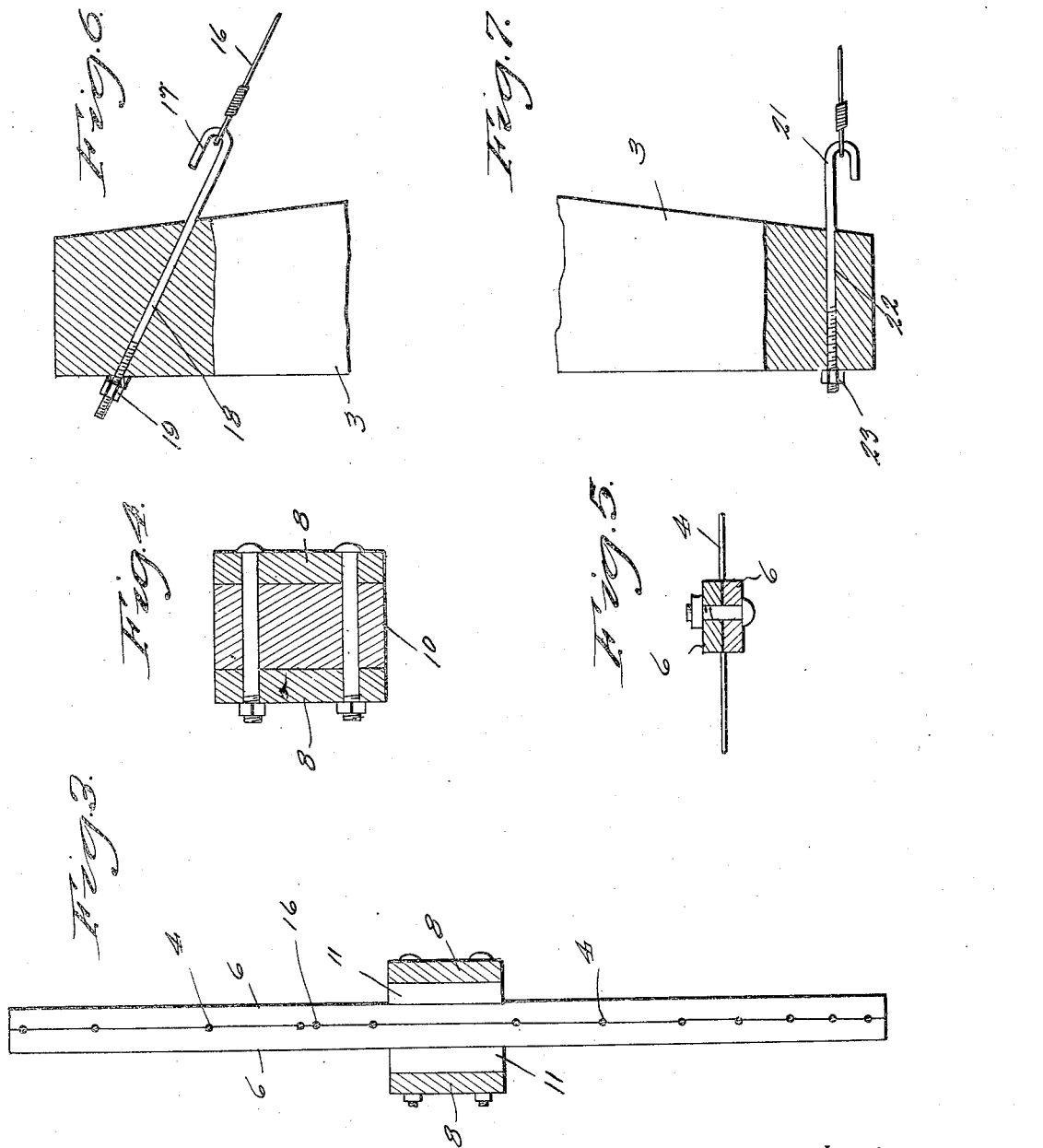

Patented Feb. 17, 1931

1,792,951

UNITED STATES PATENT OFFICE

ARGUS B. WHITEHEAD, OF PIERCETON, INDIANA

GATE STRUCTURE

Application filed February 16, 1929. Serial No. 340,416.

The present invention relates to a new useful improvement in gates and more particularly the invention has reference to a novel gate structure wherein the various structural elements composing the gate, are always maintained in taut condition.

The principal object of the invention is to provide a gate which will not only be efficient in preparation, but will be exceedingly durable in use.

Another object of the invention is to provide a gate having novel tensioning means for perpetually maintaining the gate structure in firm condition.

These and other objects of the invention will become more apparent to the reader after considering the following description and claim.

In the drawing:—

Figure 1 represents a side elevation of the improved gate.

Fig. 2 represents a top plan view of the improved gate.

Fig. 3 represents a vertical sectional view through the gate substantially taken on the line 3—3 of Fig. 1, and looking in the direction of the arrows.

Fig. 4 is a sectional view of the gate taken substantially on line 4—4 of Fig. 2.

Fig. 5 represents a fragmentary sectional view of one corner of the gate showing the adjusting member for adjusting one of the brace members.

Fig. 6 is a sectional view taken substantially on the line 5—5 of Fig. 1.

Fig. 7 represents a fragmentary sectional view of another corner of the gate and disclosing another element for adjusting one of the brace members.

Referring to the drawings wherein like numerals designate like parts, A—A, represent end posts of a fence structure at a gate opening in which the improved gate is shown mounted in Fig. 1.

The improved gate structure comprises a pair of truss members 3—3, which members are slightly increased in width at their intermediate portions. Between the truss bars 3—3, are connected a multiplicity of woven wires 4, interconnected by stay wires 5, at predetermined spaced intervals.

Bars 6, are secured to opposite sides of the wire mesh structure in pairs, and thus secured by suitable securing elements 7. A pair of tension bars 8—8 at their ends, are secured at opposite sides of the intermediate portions of the bars 3—3, and thus secured in place by a suitable number of elements 9. Spacing blocks 10—10 are interposed between the bars 8—8, in the manner shown in Fig. 2, while suitable blocks 11 are interposed between the outer sides of the bars 6 and the bars 8. A spacer 12 is provided between the intermediate portions of the bars 8—8 through which a bolt 13 extends to receive a nut 14. A barbed strand 15 is disposed across the upper ends of the bars 6 and is secured at its extremity to the bars 3—3.

A diagonally disposed brace 16 is in the form of a strong wire secured at one end to the bars 3, and at its opposite end to the hook 17 of an elongated threaded member 18, equipped with a nut 19, whereby the tension on the strand 16 may be increased as desired.

A strand of barbed wire 20 is disposed across the lower bars 6 and has one end secured to one of the bars 3 and its opposite end connected to the hooked end 21 of a threaded member 22 equipped with a nut 23 whereby the tension on the wire 20 may be increased.

One of the bars 3 is provided with suitable hinged connections with one of the posts A while the opposite post A and bar 3 are provided with complementary stop means 25—25.

In constructing a gate of this character, it will be seen that the bars 8—8 are originally bowed to a considerable extent by reason of the limited extent of the woven wires 4 connected between the bars 3—3. However, by contracting the bars 8—8 at their intermediacy, the strands will be stretched, and by disposing the bolt 13 through the bars 8—8, and threading the nut 14 thereon, this tautness may be maintained indefinitely.

It is to be understood that certain changes in the specific shape, size, and materials may be resorted to in the construction of this novel gate structure without departing from the spirit and scope thereof as claimed hereinafter.

Having thus described my invention, what I claim as new is:

A gate structure comprising a pair of end members, a wire fabrication connecting said end members, expansible means interposed between the end members, whereby the end members may be spread apart for stretching the fabrication, said means comprising outwardly bowed members adapted to be contracted at their intermediate portions to spread said members apart so as to stretch the fabrication, means for contracting said bowed members at their intermediacies, a diagonally disposed brace member on said gate structure, vertically disposed clamp bars at each side of the wire fabrication, said bars being adapted to be engaged against the fabrication by said bowed members.

In testimony whereof I affix my signature.

ARGUS B. WHITEHEAD.